United States Patent [19]

Nagasawa et al.

[11] 4,422,122

[45] Dec. 20, 1983

[54] SURGE ABSORBER

[75] Inventors: Ikuo Nagasawa; Takashi Ishii, both of Yokosuka, Japan

[73] Assignee: Fuji Electric Co., Ltd., Kawasaki, Japan

[21] Appl. No.: 345,314

[22] Filed: Feb. 3, 1982

[30] Foreign Application Priority Data

Feb. 19, 1981 [JP] Japan .................................. 56-22598
Feb. 19, 1981 [JP] Japan .................................. 56-22599

[51] Int. Cl.[3] ............................................... H02H 3/22

[52] U.S. Cl. ................................. 361/127; 338/22 R; 338/253

[58] Field of Search ......................... 361/27, 106, 127; 338/21, 22 R, 252, 253, 262, 271, 315, 316; 357/74

[56] References Cited

U.S. PATENT DOCUMENTS

| | | | |
|---|---|---|---|
| 2,405,192 | 8/1946 | Davis | 338/316 |
| 3,581,266 | 5/1971 | Weyenberg | 338/253 |
| 3,638,161 | 1/1972 | Dumas | 338/315 X |

FOREIGN PATENT DOCUMENTS

| | | |
|---|---|---|
| 54-174848 | 5/1978 | Japan . |
| 5588202 | 12/1978 | Japan . |
| 5649103 | 9/1979 | Japan . |

OTHER PUBLICATIONS

'High Energy "ZNR" Surge Absorber for Automotive Use', by Kazuo Eda et al., National Technical Report, vol. 25, No. 5, Oct. 1979, pp. 1024-1032.

*Primary Examiner*—Harry E. Moose, Jr.
*Attorney, Agent, or Firm*—Brumbaugh, Graves, Donohue & Raymond

[57] ABSTRACT

A surge absorber of a construction having a voltage non-linear resistive element composed of an oxide, a pair of electrodes attached to both surfaces of the resistive element, a lead wire connected to one of the electrodes, and a terminal plate fastened to the other electrode and having a plurality of fitting holes formed in one part thereof, the combination of the resistive element, the electrodes, and a part of the terminal plate and the lead wire being covered with a resin coating layer.

4 Claims, 15 Drawing Figures

SURGE ABSORBER

BACKGROUND OF THE INVENTION

1. Field of the Invention

This invention relates to a surge absorber which is mounted on a supporting member for use.

2. Description of Prior Arts

A surge absorber construed by utilizing a voltage non-linear resistive element composed of a oxide such as, for example, zinc oxide as a principal constituent is, in some occasion, used by supporting itself with a lead wire alone connected to an electrode provided on the resistive element. In case, however, the surge absorber of such construction is attached onto a vehicle for use, it is first placed on a supporting body through an electrode terminal thereof which also serves as a heat dissipating (or discharging) member.

FIGS. 1 and 2 of the accompanying drawing illustrate an example of a surge absorber, in which the voltage non-linear resistive element 1 has electrodes 2 and 3 on both surfaces thereof, and the electrode 2 is connected with an electrode terminal plate 4, while the electrode 3 is connected with a lead wire 5. The voltage non-linear resistive element 1, the electrodes 2, 3, and a portion of the electrode terminal plate 4 and the lead wire 5 in combination are covered with a synthetic resin coating layer 6 by immersing the combination into, and pulling it out of, a synthetic resin bath. The thus fabricated surge absorber is fixed into a supporting body with a fixing screw through a hole perforated in one part of the terminal plate 4. In this case, since there is a possibility of the resistive element 1 being subject to damage due to heat generated by surge current flowing in the resistive element because of vulnerability of the oxide constituting the element, dissipation of such generated heat is indispensable. The heat as generated is discharged mainly from the surface of the terminal plate 4 as well as through the supporting body. However, since such a surge absorber is only supported at one side of its terminal plate 4 through a single hole 7, it is susceptible to various disadvantages such that, due to vibration of the vehicle, on which it is placed, the surge absorber rotates with the fixing screw thereof as its center to cause its fitting onto the supporting body to become unstable due to loosening of the fixing screw, or the electrical connection or heat dissipation to be insufficient, or the lead wire to be broken.

SUMMARY OF THE INVENTION

It is therefore an object of the present invention to provide a surge absorber which is free from the above-mentioned disadvantages and capable of being stably mounted on a supporting body.

The above object of the present invention can be attained by connecting a lead wire to one of the electrodes provided on both surfaces of the voltage non-linear resistive element, and fastening the terminal plate having a plurality of fitting holes formed therein to the other electrode.

The foregoing object and other objects of the present invention as well as its construction and function will become more apparent and understandable from the following detailed description of the invention, when read in conjunction with the accompanying drawing.

BRIEF DESCRIPTION OF THE ACCOMPANYING DRAWING

In the drawing

DETAILED DESCRIPTION OF PREFERRED EMBODIMENTS

Figure 1:
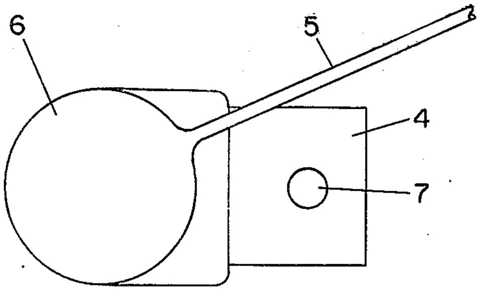
FIG. 1 PRIOR ART
FIGS. 1 and 2 show respectively a top plan view and a side view in longitudinal cross-section of one embodiment of the conventional surge absorber.
Figure 2:
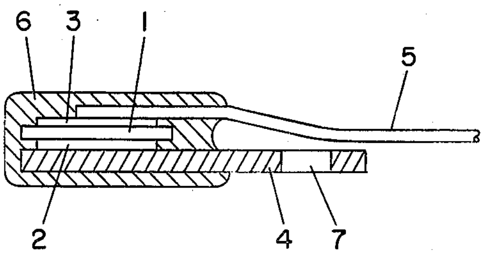
FIG. 2 PRIOR ART

In the following, the present invention will be described in specific details in reference to the accompanying drawing. It should be noted that those elements and component parts common to each and every figure of the drawing (inclusive of FIGS. 1 and 2 which illustrate the conventional surge absorber) are designated by the same reference numerals.

Figure 3:
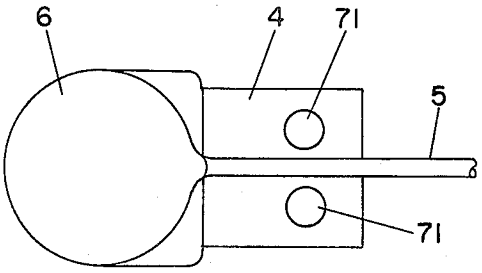
FIGS. 3 and 4 show respectively a top plan view and a side view in longitudinal cross-section of the first embodiment of the surge absorber according to the present invention.
Figure 4:
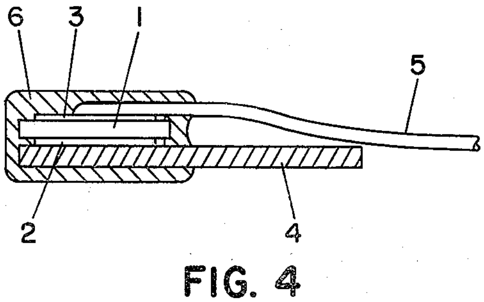

Referring to FIGS. 3 and 4, the electrode terminal plate 4 soldered to one of the electrode 2 provided on one surface of the voltage non-linear resistive element 1 has two fitting holes 71, 71 juxtaposed in the breadthwise direction thereof, and the lead wire 5 connected to the other electrode 3 is drawn out in the lengthwise direction of the terminal plate 4 passing between the two fitting holes 71, 71. The resistive element 1, the electrodes 2, 3, and a part of the terminal plate 4 and the lead wire 5 are covered with a resin coating layer 6.

Figure 5:
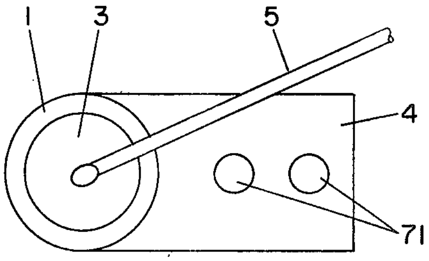
FIG. 5 is a top plan view of the second embodiment of the surge absorber according to the present invention with its resin coating layer being removed.
Figure 6:
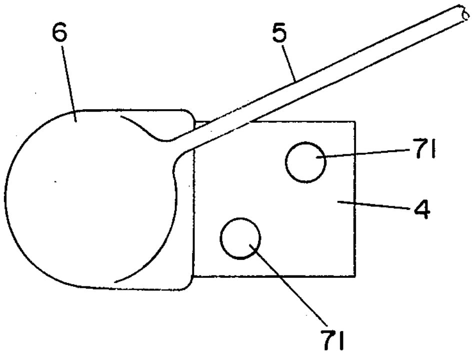
FIG. 6 is also a top plan view of the third embodiment of the surge absorber according to the present invention.

When this surge absorber is mounted on a supporting body, there is no possibility of its becoming unstable and loosened in its fitting position, thanks to the two holes formed in the terminal plate 4, even when the fixing screws are loosened. In addition, since the lead wire 5 is drawn out in the direction of the longitudinal axis of the terminal plate 4 passing over the middle part of the plate between the two fitting holes 71, 71, the area of the surge absorber to occupy any part of an object, on which it is fitted, can be reduced. In case, however, the lead wire needs to be drawn out in an oblique direction for the convenience of its fitting, the fitting holes 71, 71 may be arranged in a vertical row along the longitudinal axis of the terminal plate 4 as shown in FIG. 5, wherein the device is illustrated with the resin coating layer being removed. Or else, the fitting holes may be arranged obliquely with respect to the longitudinal axis of the terminal plate 4, as shown in FIG. 6, for its stable mounting on the supporting member.

Figure 7:
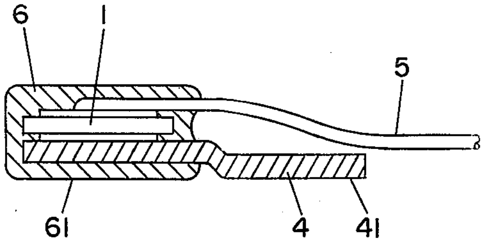
FIG. 7 is a side view in longitudinal cross-section of the fourth embodiment of the surge absorber according to the present invention.

FIG. 7 further illustrates a modified embodiment of the surge absorber, wherein a stepped portion is formed in the terminal plate 4, and the bottom surface 61 of the resin coating layer 6 is made flush with the fitting surface 41 of the terminal plate 4, whereby the surge absorber can be placed on, and in contact with, the surface of the supporting member in its full length, hence more stable resting can be secured.

Figure 8:
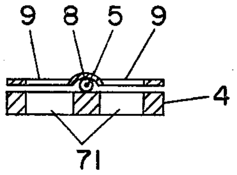
FIG. 8 is a cross-sectional view of the terminal plate of the fifth embodiment of the surge absorber according to the present invention.

In FIG. 8, the lead wire 5 of the surge absorber shown in FIG. 4 is insulatively fixed on the terminal plate 4 with an appropriate fitting 8 to prevent the lead wire 5 from displacing its set position due to vibration caused to the surge absorber, and also from its breakage. The terminal plate 4 per se rests on the supporting member through the fitting holes 71, 71 and the corresponding holes 9, 9 formed in the metal fitting 8.

Figure 9:
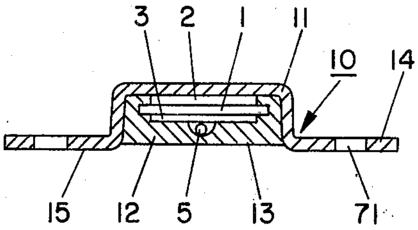
FIGS. 9, 10 and 11 are respectively a cross-sectional view, a top plan view, and a front view of the sixth embodiment of the surge absorber according to the present invention.
Figure 10:
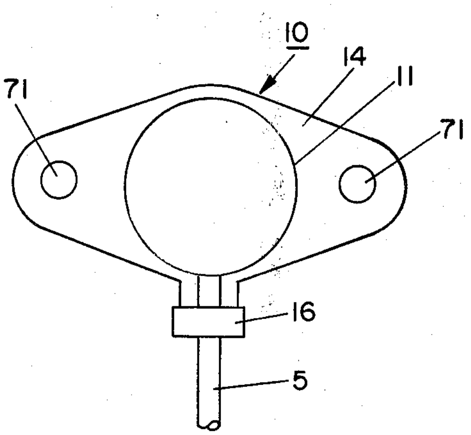
Figure 11:
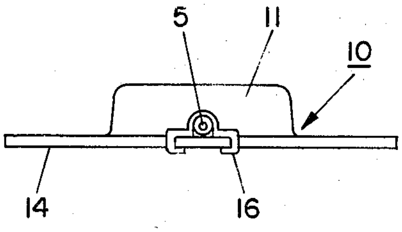

In the embodiments shown in FIG. 9 et seq., the surge absorber is in such a construction that the resin coating layer does not protrude over the fitting surface of the surge absorber when it is mounted on the supporting member, hence the device is well protected from mechanical damage or danger of inflammation. As is apparent from the cross-sectional view of FIG. 9, the electrode 2 on one surface of the voltage non-linear resistive element 1 is soldered to the bottom surface of the recessed part 11 of an inverted dishshaped metal vessel 10 made of copper, iron, etc., and also serving as the terminal plate. The other electrode 3 on the resistive element 1 is connected with the lead wire 5 as by soldering. The lead wire 5 itself is insulatively coated and drawn out by causing it to pass through the surrounding wall of the recessed part 11 of the vessel 10 as shown in FIG. 10 (top plan view) or FIG. 11 (front view). The interior of the recessed part 11 is filled with incombustible silicone resin 12 to cover the combination of the resistive element 1, the electrodes 2, 3, and the lead wire 5. In this case, it has to be seen to it that the surface 13 of the resin material as filled may not protrude beyond the surface 15 of the peripheral brim 14 of the vessel 10. A pair of fitting holes 71, 71 are perforated in the peripheral brim 14 at symmetrical positions. The lead wire 5 is secured in position by a metal fitting 16 at one part of the peripheral brim 14 where it is just drawn out from the recessed part 11 of the vessel 10 through its surrounding wall.

Figure 12:
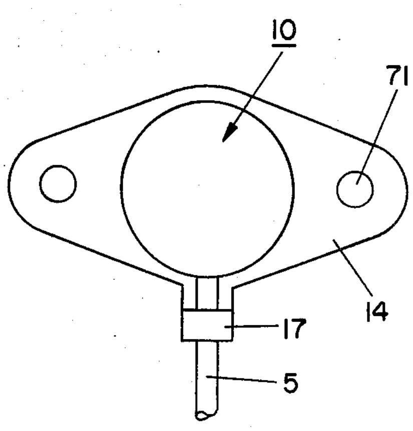
FIGS. 12 and 13 are respectively a top plan view and a front view of the seventh embodiment of the surge absorber according to the present invention.
Figure 13:
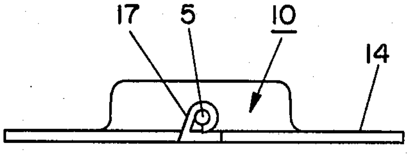

FIGS. 12 and 13 illustrate different embodiments of the surge absorber according to the present invention, wherein the lead wire 5 is fixed in position on one part of the peripheral brim 13 of the vessel 10 with a piece 17 cut out of that portion of the peripheral brim 13.

Figure 14:
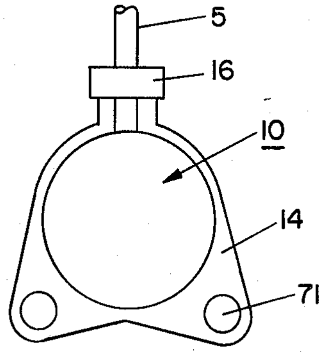
FIGS. 14 and 15 are respectively top plan views of the eighth and ninth embodiments of the surge absorber according to the present invention.
Figure 15:
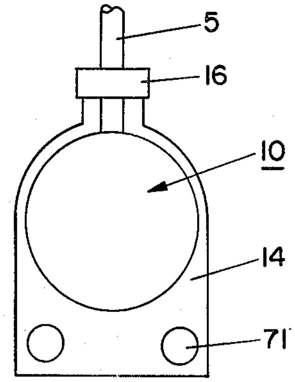

FIGS. 14 and 15 illustrate still other embodiments of the surge absorber according to the present invention, in which the fitting holes 71, 71 are not arranged at symmetrical positions with respect to the vessel 10, but they are formed at one side of the vessel. This arrangement of the fitting holes are conveniently employed where there is a critical limit to the size of the supporting member.

By the use of such terminal plate as the metal vessel, the heat to be generated at the current flow can be efficiently dissipated, and, when the device is mounted flat on the supporting member, it can be well protected from any external mechanical force or fire, as the filled resin is perfectly covered with the vessel. Particularly, when the resin of a difficult burning property (or incumbustibility) is used, it can be well prevented from burning at the time of fire of the vehicle where the device is installed.

Incidentally, in the above-described embodiments, the fitting holes 71 are formed in pairs. However, they are not limited to two, but three or more holes may be formed, depending on necessity, either in even numbers or odd numbers.

As stated in the foregoing, the surge absorber according to the present invention can be stably mounted on the supporting member through two or more numbers of the fitting holes, so that it can be employed as the highly reliable surge absorber for vehicle.

Although, in the foregoing, the present invention has been described in reference to several preferred embodiments, it should be understood that the present invention is not restricted to these embodiments alone, but any changes and modifications may be made within the spirit and scope of the present invention as set forth in the appended claims.

What is claimed is:

1. A surge absorber comprising a lead wire connected to one of two electrodes provided on both surfaces of a voltage non-linear resistive element, and a terminal plate comprising a dish-shaped metal vessel having a surrounding wall, a center recessed portion and a planar peripheral brim surrounding said center recessed portion, wherein said resistive element is secured to the bottom surface of said metal vessel by one of said electrodes, wherein said lead wire is connected to the other electrode of said resistive element, and is insulated from, and passes through, the surrounding wall of said center recessed portion, wherein a resin coating layer is filled in said recessed portion to cover said resistive element and to be generally co-planar with the surface of said peripheral brim, and wherein at least two fitting holes are formed in a part of the brim for mounting the absorber to a supporting body.

2. The surge absorber according to claim 1, including means for securing said lead wire to said terminal plate.

3. The surge absorber according to claim 2, wherein said securing means comprises a metal fitting.

4. The surge absorber according to claim 2, wherein said securing means comprises a bended cut out portion of said terminal plate.

* * * * *